(12) United States Patent
Choulet

(10) Patent No.: US 9,195,916 B1
(45) Date of Patent: Nov. 24, 2015

(54) COLOR PREDICTION FOR COLOR PRINTING

(71) Applicant: ELECTRONICS FOR IMAGING, INC., Fremont, CA (US)

(72) Inventor: Luc Choulet, Charnay les Macon (FR)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 14/296,870

(22) Filed: Jun. 5, 2014

(51) Int. Cl.
 *H04N 1/60* (2006.01)
 *G06K 15/02* (2006.01)

(52) U.S. Cl.
 CPC .................... *G06K 15/027* (2013.01)

(58) Field of Classification Search
 None
 See application file for complete search history.

(56) References Cited

U.S. PATENT DOCUMENTS

| | | | |
|---|---|---|---|
| 6,178,007 B1 * | 1/2001 | Harrington | 358/1.9 |
| 7,619,771 B2 * | 11/2009 | Jacob et al. | 358/1.9 |
| 8,412,055 B2 * | 4/2013 | Chandu et al. | 399/15 |
| 8,947,739 B2 * | 2/2015 | Teraue | 358/3.24 |
| 2005/0088710 A1 * | 4/2005 | Nakayama | 358/518 |
| 2010/0328688 A1 * | 12/2010 | Sakamoto et al. | 358/1.9 |
| 2011/0280589 A1 * | 11/2011 | Chandu et al. | 399/15 |
| 2012/0188596 A1 * | 7/2012 | Niles et al. | 358/1.15 |
| 2012/0206745 A1 * | 8/2012 | Shibuya | 358/1.9 |
| 2013/0107291 A1 * | 5/2013 | Kuehn | 358/1.9 |
| 2013/0121710 A1 * | 5/2013 | Matsuzaki | 399/39 |
| 2013/0155427 A1 * | 6/2013 | Ichihashi | 358/1.9 |
| 2013/0222859 A1 * | 8/2013 | Uratani et al. | 358/3.24 |

* cited by examiner

*Primary Examiner* — Dung Tran
(74) *Attorney, Agent, or Firm* — Michael A. Glenn; Perkins Coie LLP

(57) ABSTRACT

Color prediction for color printing is performed in response to loading media into a printer and initiation of a calibration sequence, using one or more sensors to measure physical properties of the media. Based at least upon the measured physical properties, an optimal preset is identified in a database and the optimal preset is loaded into the printer as a starting calibration. A difference from values in the optimal preset loaded into the printer and those of the measured physical properties is determined and the printer prints a chart. The sensors measure the chart and the measurements of the chart are used to fine tune the optimal preset. The fine tuned preset is then saved as a new media profile.

4 Claims, 11 Drawing Sheets

COLOR PREDICTION FOR COLOR PRINTING

BACKGROUND OF THE INVENTION

1. Technical Field

The invention relates to printing. More particularly, the invention relates to color prediction for color printing, as applied to technical analysis for defining the best setting before running a complete calibration and/or characterization process, calibration, characterization, special effect creation, proofing, and quality control

2. Description of the Background Art

In color printing, prints consist of images and the colors that make up the images. Such process is complex and concerns such factors as, for example, technical analysis for defining the best setting before running a complete calibration and/or characterization process, calibration, characterization, special effect creation, proofing, and quality control. In one example, it is necessary to provide an accurately calibrated printer if the print is to be a faithful reproduction of the original image. When performing a calibration before printer production for printer software and/or for the printer itself, it is necessary to create a complete calibration for a dedicated configuration. Current approaches to the calibration process provide a static solution. Thus, if one parameter is changed after such calibration is performed, such as media, ink, resolution, speed, halftone influences, etc., it is necessary to redo the entire calibration.

Such approaches are not flexible in a production setting. Thus, it is not possible to calibrate a printer during production of the printer for a new media that becomes available after the printer is sold, nor is it possible during such manufacture to take into account such environmental factors as the influence of temperature variations on the final print.

SUMMARY OF THE INVENTION

Embodiments of the invention concern accurate color prediction prior to the printing of an image, graphic design, text, etc. with either the use of a small test form or without a test form altogether. In an embodiment, color prediction for color printing is performed in response to loading media into a printer and initiation of a calibration sequence, by using one or more sensors to measure physical properties of the media, or by comparing status relative to a pre-defined reference. Based at least upon the measured physical properties, an optimal preset is identified in a database and the optimal preset is loaded into the printer as a starting calibration. A difference from values in the optimal preset loaded into the printer and those of the measured physical properties is determined and the printer prints a reference, such as a chart. The sensors measure the chart and the measurements of the chart are used to fine tune the optimal preset. The fine tuned preset is then saved as a new media profile.

Embodiments of the invention thus concern a technique that provides a useful color prediction of the printing process used, in accordance with parameters and user choice preferences, with requiring printing and measuring a significant number of patches.

For any printing process, the printing machine is configured to deposit a quantity of ink localized on a media in the digital domain, analog domain, or both. By creating gradients and, as appropriate, overprint colored inks together, a colored result is obtained, e.g. an image, a photograph, artwork, or combination thereof.

For the user and user in accordance with their quality expectations, it is necessary to:

1) Know the color response printed on the media in relation to the instructions given. e.g. % of primary channel;
2) Obtain a smooth color transition in all directions, and a well balanced contrast, lightness, and hue distribution. This is one goal of a calibration phase of the invention;
3) Determine a correlation between the instruction given and the instruction source to match color expectations. This is one goal of a characterization phase of the invention; and
4) Provide accurate feedback, such as a prediction of the final printed result to assist human and software decision making before printing, e.g. provide applications include the proofing, quality control, and special effect creation phases of the invention.

For all of these phases, considering that the final colored result is a combination of defined and variable factors, e.g. media color, ink color, temperature, curing, post print operation, etc., it is necessary to print color combinations, measure the printed color combinations, and establish the relation between the input values and the output values.

For a useful print quality according to the state of the art it is typically necessary to print many patches for all of these processes, i.e. more than 400 and usually 1500 to 2000 patches for a four color (4CLR) process, such as CMYK. For an extended color set, e.g. 6CLR, 6000 to 7500 patches may be printed. Providing a similar useful quality, but with the use of fewer printed patches, e.g. between 20 to 100, is one goal of the invention. Because there are fewer patches to measure, and also some unusual measures to do, such as comparing results to the user experience, embodiments of the invention can be used in connection with embedded measuring devices inside the printer to provide a process that is simple and fast. Those skilled in the art will appreciate that the invention could be practiced without embedding measuring devices inside the printer.

DETAILED DESCRIPTION OF THE INVENTION

Embodiments of the invention address three fundamental concepts:

Measuring the media and a small number of patches of ink to look up an optimal preset of model parameters in a database and then to modify model parameters based on the delta between the measured values and the preset (or more generally an interpolation between multiple presets if that makes more sense);

A media and ink model that allows one to measure far fewer patches, especially for characterization, and a database of model parameters; and A process of calibration and/or linearization and characterization that iterates and goes between the two.

Simplifying Calibration and Characterization

Figure 1A:
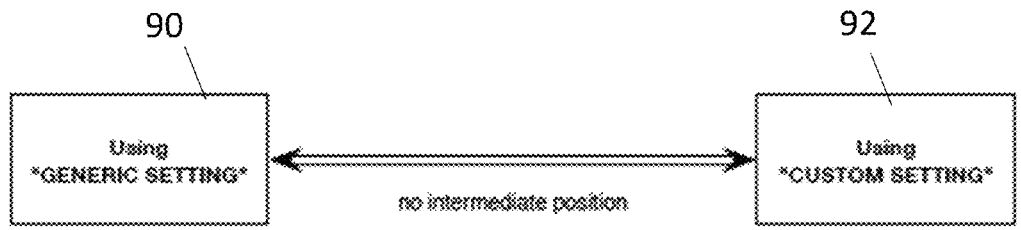
FIGS. 1A and 1B show calibration and characterization (FIG. 1A) and simplification of calibration and characterization according to the invention (FIG. 1B)
Figure 1B:
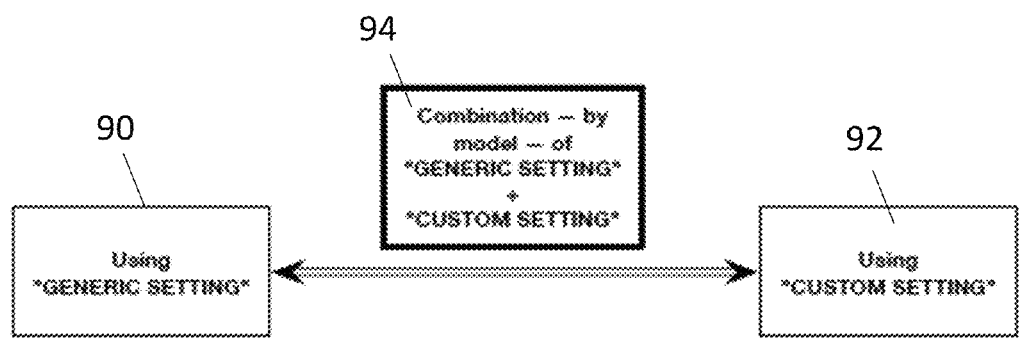

FIGS. 1A and 1B show calibration and characterization (FIG. 1A) and simplification of calibration and characterization according to the invention (FIG. 1B).

Currently, there are two solutions for defining a calibration and/or a characterization (see FIG. 1A). In FIG. 1A, in the state of the art either a generic setting 90 is chosen or a custom setting 92 is chosen, but no intermediate setting is available.

One solution is to load an existing calibration and/or a characterization as generic. While this is an easy and fast solution because there is nothing to print or to measure, such approach is not adapted if the real setting is not in accordance to the generic setting, e.g. not the same media as the used to produce the generic setting. Further, such approach is not adapted if the physical conditions are not the same as the generic setting, e.g. the printer is operated at a temperature that is not the same temperature in the printer site at which the generic setting is developed. Finally, such approach is static solution, i.e. it is not flexible.

A second approach is to create a custom calibration and/or a characterization as custom. Such approach is very dedicated to the technical setting of the user, but it is time consuming and not a flexible approach. Such approach is a static solution that is not flexible, i.e. if something changes it is necessary to redo most of the process.

One goal of the invention is to provide a third choice, as a combination of both benefits. Thus, in FIG. 2B a combination setting 94 is provided by creating a model based upon a generic setting and a custom setting.

Accordingly, embodiments of the invention address concerns regarding accurate color prediction prior to the printing of an image, graphic, text, etc. with either the use of a small test form or without a test form altogether. In an embodiment, color prediction for color printing is performed in response to loading media into a printer and initiation of a calibration sequence, by using one or more sensors to measure physical properties of the media, or by comparing status relative to a pre-defined reference. Based at least upon the measured physical properties, an optimal preset is identified in a database and the optimal preset is loaded into the printer as a starting calibration. A difference from values in the optimal preset loaded into the printer and those of the measured physical properties is determined and the printer prints a reference, such as a chart. The sensors measure the chart and the measurements of the chart are used to fine tune the optimal preset. The fine tuned preset is then saved as a new media profile.

Figure 2:
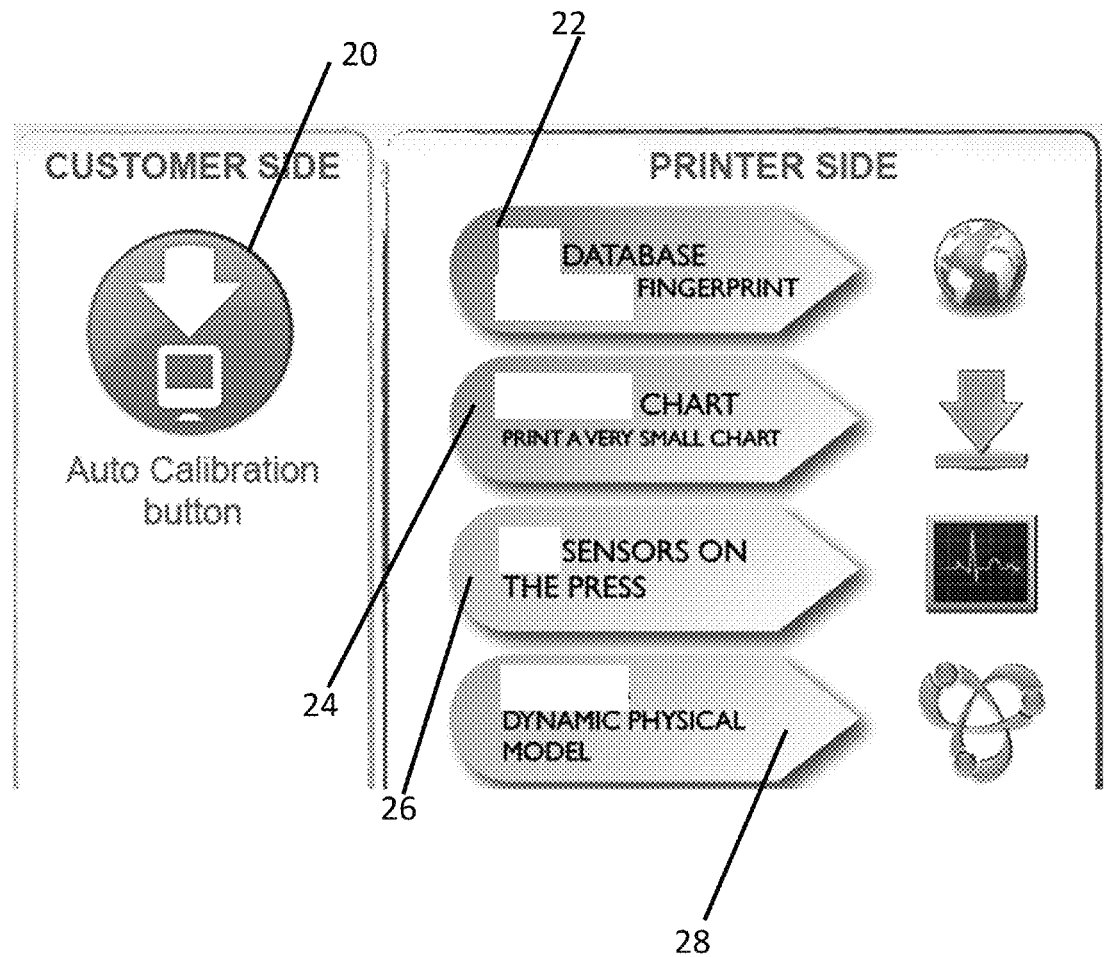
FIG. 2 is a block schematic diagram showing an architecture for color prediction for color printing according to the invention.

FIG. 2 is a block schematic diagram showing an architecture for color prediction for color printing according to the invention. In the embodiment of the invention shown in FIG. 2, the user, e.g. user, places the media in the printer and presses an auto calibration button 20. The printer uses a database 22 that contains a media fingerprint as a starting point in the calibration. A small control chart 24 is printed at the printer and sensors 26 on the printer scan the chart. The calibration is completed by updating a dynamic physical model 28 of the printer and media. In an embodiment, the system predicts about 80% of the final result and creates a first calibration from the database before printing the small control chart. The entire process requires no more than one or two steps. Any changes in the user's process are simply taken into account and are immediately used to generate an adjusted calibration. While the embodiment of the invention shown in FIG. 2 concerns a printer having a built-in measuring device and auto calibration button, those skilled in the art will appreciate that embodiments of the invention may be practiced with an external measuring device and/or with an auto calibration facility that is separate from the printer itself and/or through manual measurements.

Figure 3:
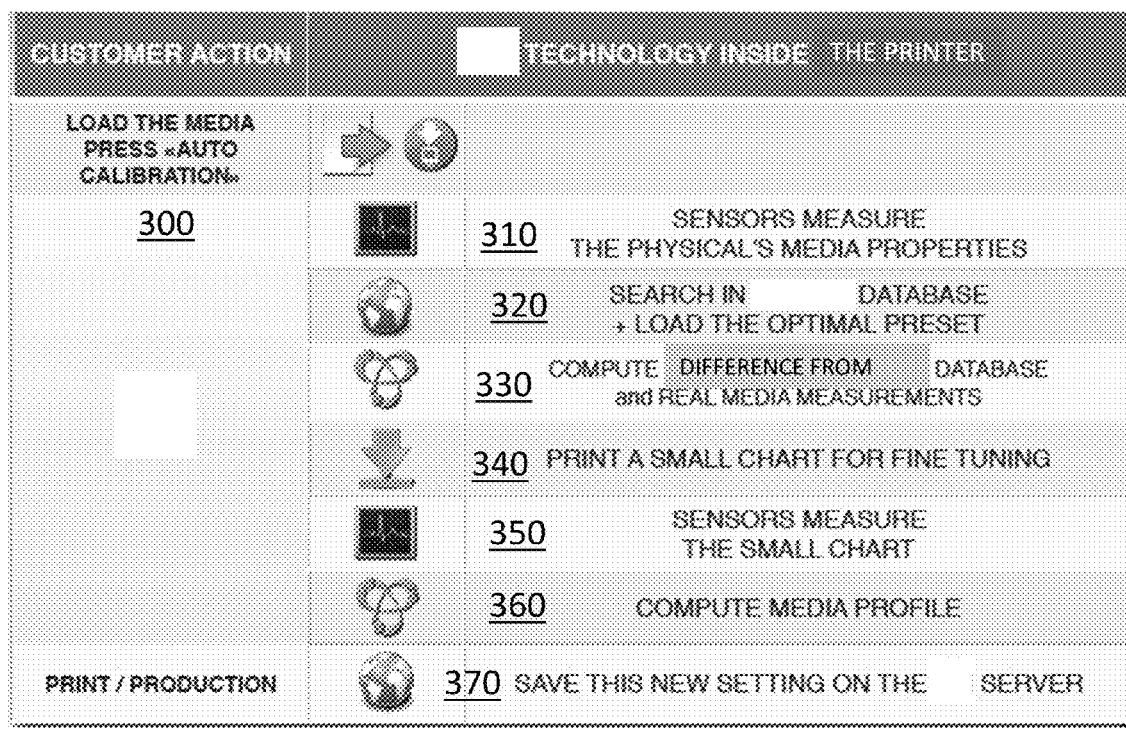
FIG. 3 is a flow chart showing color prediction for color printing according to the invention.

FIG. 3 is a flow chart showing color prediction for color printing according to the invention. In the embodiment of the invention shown in FIG. 3, the media is loaded into the printer and the user presses the auto calibration button (300). Sensors in the printer measure the physical properties of the media (310). The database is searched and an optimal preset is identified, which is then loaded into the printer as the starting calibration (320). A processor within the printer computes the difference from the values in the preset loaded into the printer from the database and the real media measurements made with the sensors (330). The printer prints a reference, such as a chart that is used to fine tune the preset calibration (340). The sensors are then used to measure the chart (350) and a media profile is computed (360). The media profile is then saved as a new setting by a database server (370).

Figure 4:
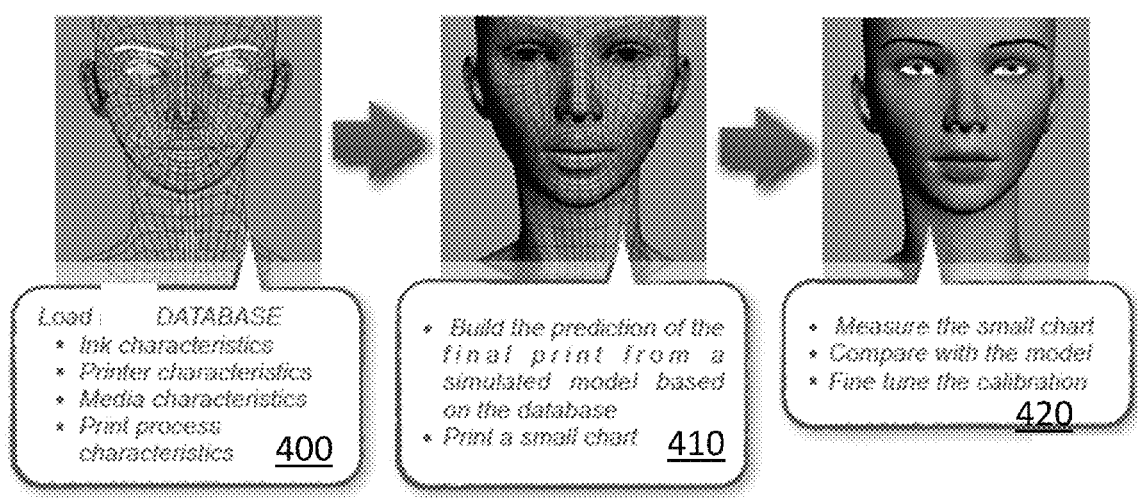
FIG. 4 is a more detailed flow chart showing color prediction for color printing according to the invention.

FIG. 4 is a more detailed flow chart showing color prediction for color printing according to the invention. In a manner similar to that of realistic image synthesis, embodiments of the invention create a realistic calibration synthesis without first printing an image. In accordance with the technique disclosed herein, the results are predicted dynamically. In FIG. 4, the database is loaded (400) which includes information about ink characteristics, printer characteristics, media characteristics, and print process characteristics. The prediction of the final print is built from a simulated of the totality of the print scenario (410) and a chart is printed based upon this predicted model. The chart is measured and compared with the model (420), and the results of the comparison are used to fine tune the calibration.

Embodiments of the invention provide a model for describing the color fingerprint of a desired setting, based on few measurements. With this model, e.g. a mathematic function of parameters, the result is easy and fast to compute and does not require much data.

In embodiments of the invention there are three main steps:
1) The model's parameters creation and database administration;
2) Loading the parameters from a database to compute a simplified calibration and characterization process; and
3) Loading parameters from the database for comparison with parameters and/or data measured on a daily print for a quality report.

One approach to creating the model is as follows:
1. Measure a ramp for each primary color in the relative density domain and search a Yule-Nielsen factor for a better match with the measurement (for %, not 100%). Note: The Yule-Nielsen effect, sometimes known as optical dot gain, is a phenomenon caused by absorption and scattering of light by the substrate. Light becomes diffused around dots, darkening the apparent tone. As a result, dots absorb more light than their size would suggest (see, also, Qian, Y., Mahfooth, N., Kyan, M., *Improving the Yule-Nielsen modified spectral Neugebauer model using Genetic Algorithms*, researchgate.net (2013);

2. From relative primary and overprint (2CLR, 3CLR, . . . ) in the relative density domain search the polynomial parameter (2 or 3th degree) to fit the theoretical density by overprint for comparison with the real density by overprint;

3. Save the values for the Yule-Nielsen factor for each primary color and the polynomial parameter for fitting in nD all overprint combinations;

4. On the printer, reprint 50%, 100% and overprint. With sensor online/outline, measure relative density, compare the prediction actual measurements, and adjust the parameters if necessary; and 5. Other sensors, such as for gloss, a densitometer by transmittance, etc. could also be used for other cases, such as calibration for transparent media, densitometric overprint correction if this is factor in relation to the gloss level, etc.

Table 1 below shows the performance of a standard YNSN. Note that these are not cellular models but they have lookup dot gain tables linearly regressed to minimize error for single channels.

TABLE 1

Prediction and Measurement of Color Difference of spectral n vs. Single n

| | Spectral n | | Single n | |
|---|---|---|---|---|
| | Best 95% Mean | Worst 5% Mean | Best 95% Mean | Worst 5% Mean |
| $\Delta E_{56}$ | 1.0012 | 2.7912 | 1.2361 | 3.5783 |
| $\Delta E_{24}$ | 0.6920 | 1.7924 | 0.8368 | 2.2391 |
| $\Delta E_{80}$ | 0.6877 | 1.8382 | 0.8191 | 2.1911 |

Figure 5:
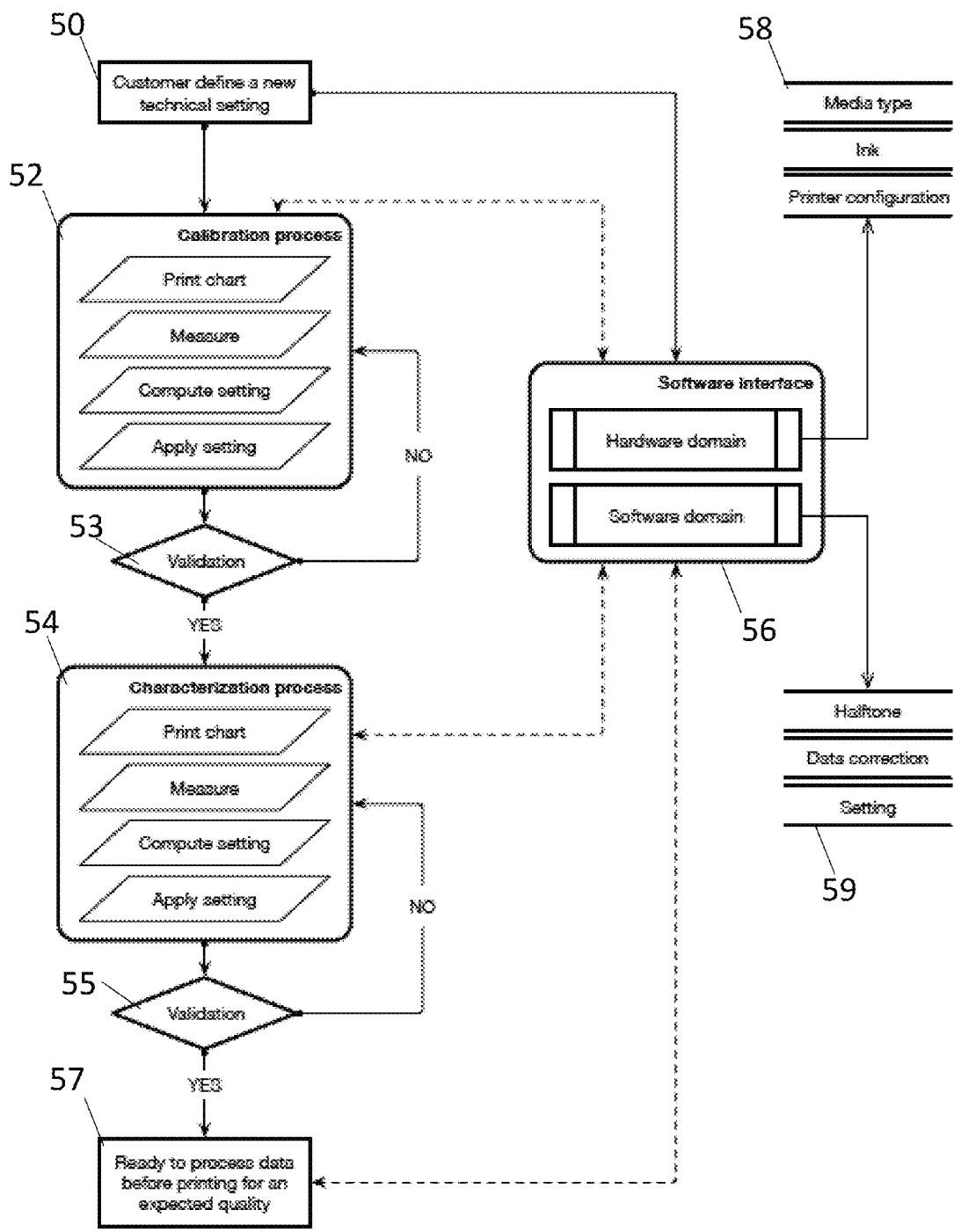
FIG. 5 is a block schematic diagram showing a sequential view for a new a technical setting according to the invention.

FIG. 5 is a block schematic diagram showing a sequential view for a new a technical setting, such as a new ink, media, special effect, etc., according to the invention. In FIG. 5, a user 50 seeks to define a new technical setting for a print job. A software interface 56 is provided to allow user interaction with the system. The software interface controls a hardware domain 58 for adjusting such factors as media type, ink, and printer configuration; and the software interface controls a software domain 59 for adjusting such factors a half toning, data correction, and settings.

A calibration process 52 receives the request from the user and, via the software interface 56, prints a reference, such as a, measures the results, computes a setting, and applies the setting. A validation step 53 is then executed.

If validation does not succeed, i.e. a difference between a stored parameter and the measured parameter is detected, the calibration process is repeated; if calibration does succeed, then a characterization process 54 proceeds, via interaction with the software interface 56, in which a reference, such as a chart is printed and measured. A setting is computed from the measurement and the setting is applied. A validation step 55 is then executed.

If validation does not succeed, i.e. a difference between a stored parameter and the measured parameter is detected, the characterization process is repeated; if characterization does succeed, then the system is ready 57, via the software interface 56, to process data for an image before printing because the printing process now predictably yields an expected quality.

Figure 6:
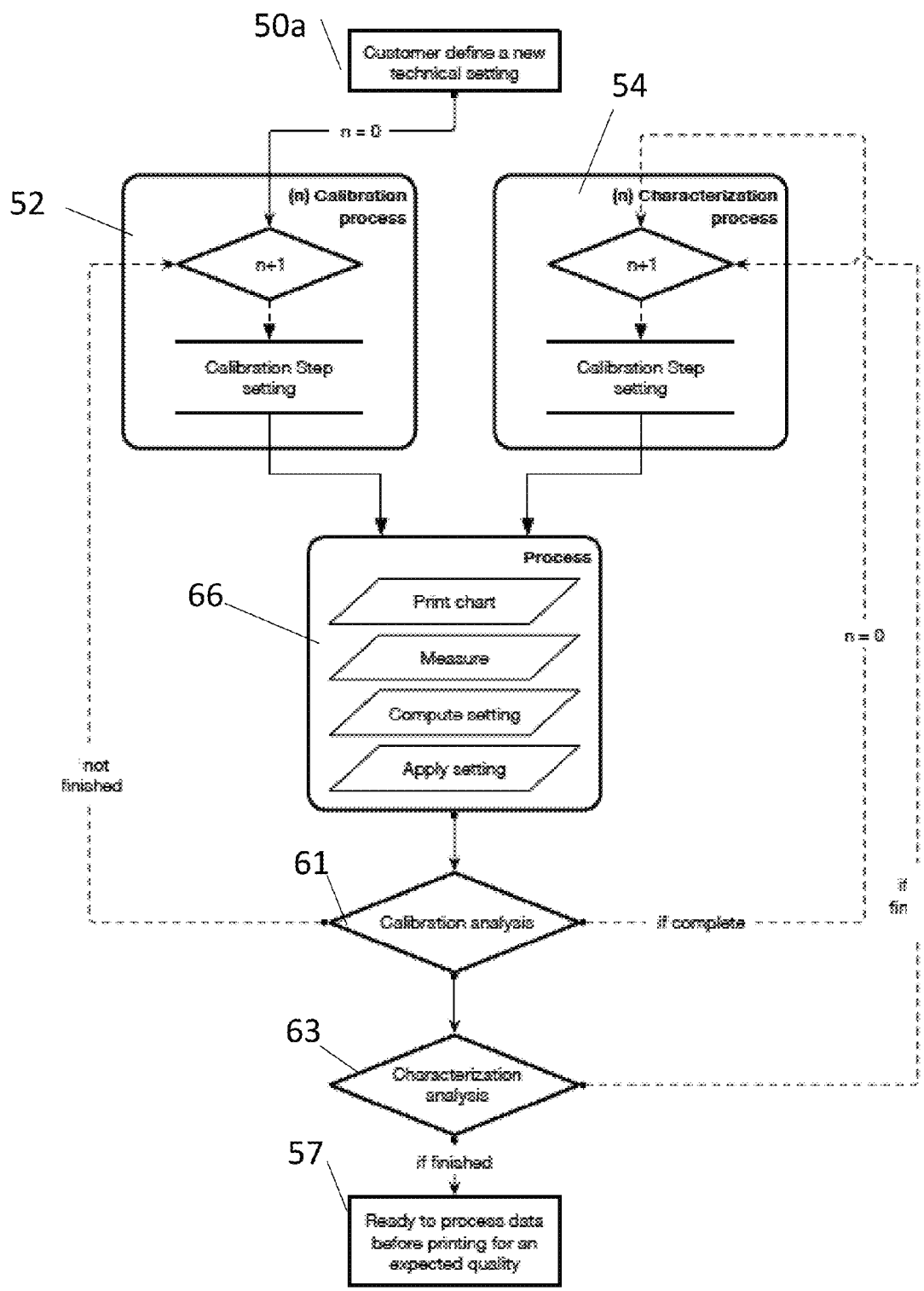
FIG. 6 is a block schematic diagram showing a closed loop view for a new technical setting according to the invention.

FIG. 6 is a block schematic diagram showing a closed loop view for a new technical setting according to the invention. In FIG. 6 a user 50a initially defines a new technical setting. A calibration process 52 is executed, as described in connection with FIG. 5.

After the calibration process is executed, a further process 66 is performed, in which a reference, such as a chart is printed and measured and a setting is computed and applied. Thereafter, a calibration analysis 61 is performed. If the calibration process is not finished, i.e. a difference between a stored parameter and the measured parameter is detected, then the calibration process is repeated; if the calibration process is finished, then a characterization process 54 is executed, as described in connection with FIG. 5.

After the characterization process is executed, a further process 66 is performed, in which a reference, such as a chart is printed and measured and a setting is computed and applied. Thereafter, a calibration analysis 61 is performed. If the calibration process is not finished, i.e. a difference between a stored parameter and the measured parameter is detected, then the calibration process is repeated; if the calibration process is finished, then a characterization analysis 63 is performed. If the characterization process is not finished, i.e. a difference between a stored parameter and the measured parameter is detected, then the characterization process is repeated; if the characterization process is finished, then the system is ready 57 to process image data before printing because the printing process now predictably yields an expected quality.

Figure 7:
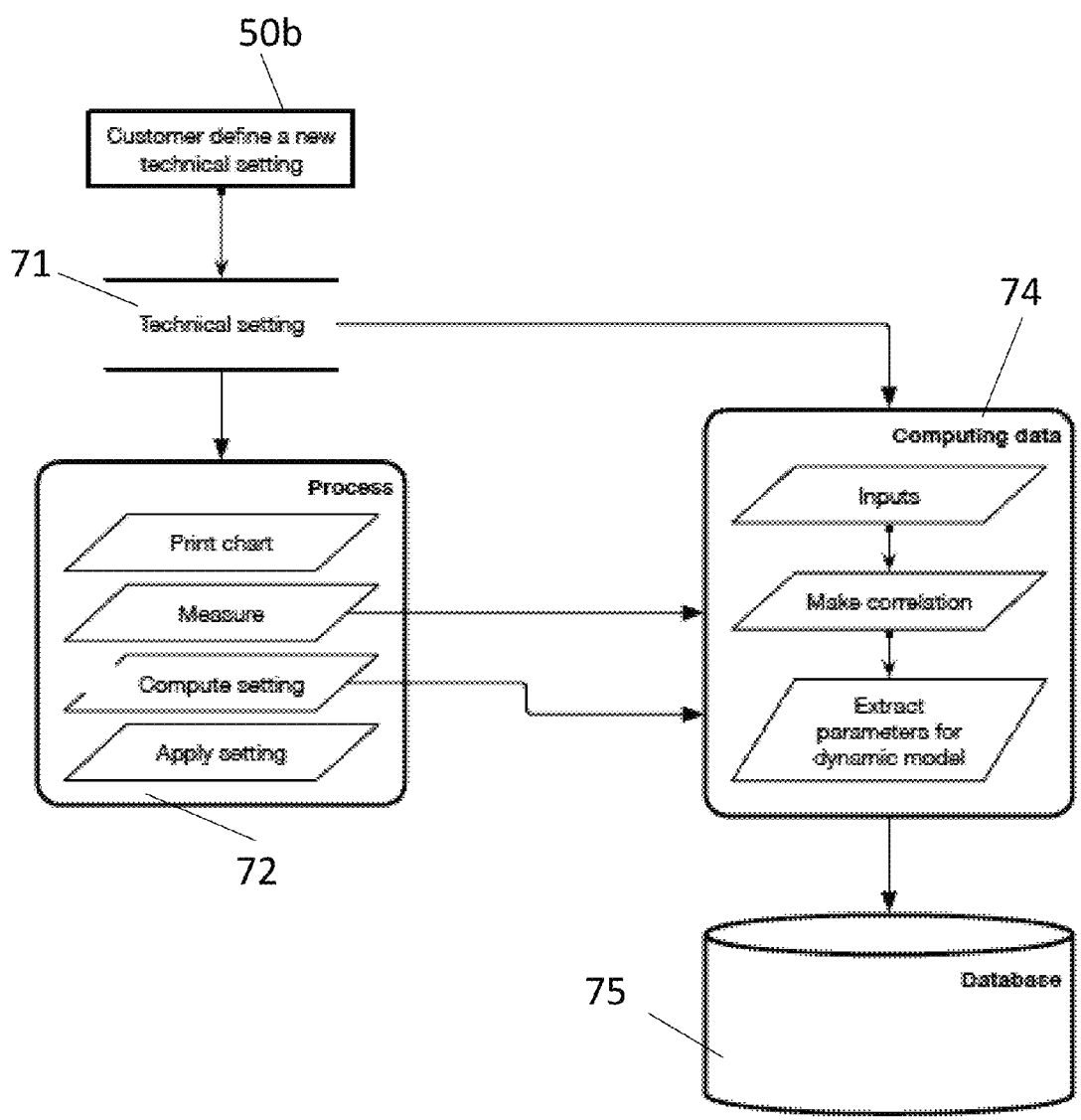
FIG. 7 is a block schematic diagram showing the relation between measurements and a database according to the invention.

FIG. 7 is a block schematic diagram showing the relation between measurements and a database according to the invention. In FIG. 7, a user 50c initially defines a new technical setting 71. Computing data 74, including data processed during steps of receiving the technical settings and stored parameters as inputs, determining corrections, and extracting parameters for a dynamic model process the technical setting, is saved to and accessed from a database 75.

The technical setting is applied to a process 72, in which a chart is printed and measured and a setting is computed and applied. Interaction of the technical setting and process 72 includes receiving the technical setting and process outputs, making correlations between these inputs and extracting parameters therefrom to build the dynamic model.

Model Parameters

Model parameters are obtained, for example, from a preanalysis that is saved in a local and/or remote database and/or from an on-line analysis done by the printer or/and the user during the calibration and/or characterization and/or production printing process.

In embodiments of the invention, class parameters are defined, for example, as any of:

a) Proprietary generic parameters that are computed only by proprietary software, for example by a vendor support organization, and based on a reference printer for average values, min/max in relation to physical facts, in well defined condition and according to predefined setting;

b) Proprietary private parameters that are computed only by proprietary software, for example by a vendor research organization, due to difficult or costly to extract, e.g. processing resources, expensive or complex measurement equipment needed, knowledge, etc., sensitive and need to be protected as know-how; and c) User parameters that are computed only by proprietary software, by a vendor support organization or by a user on the user's printer and/or at the user's site and/or using the user's setting.

Figure 8:
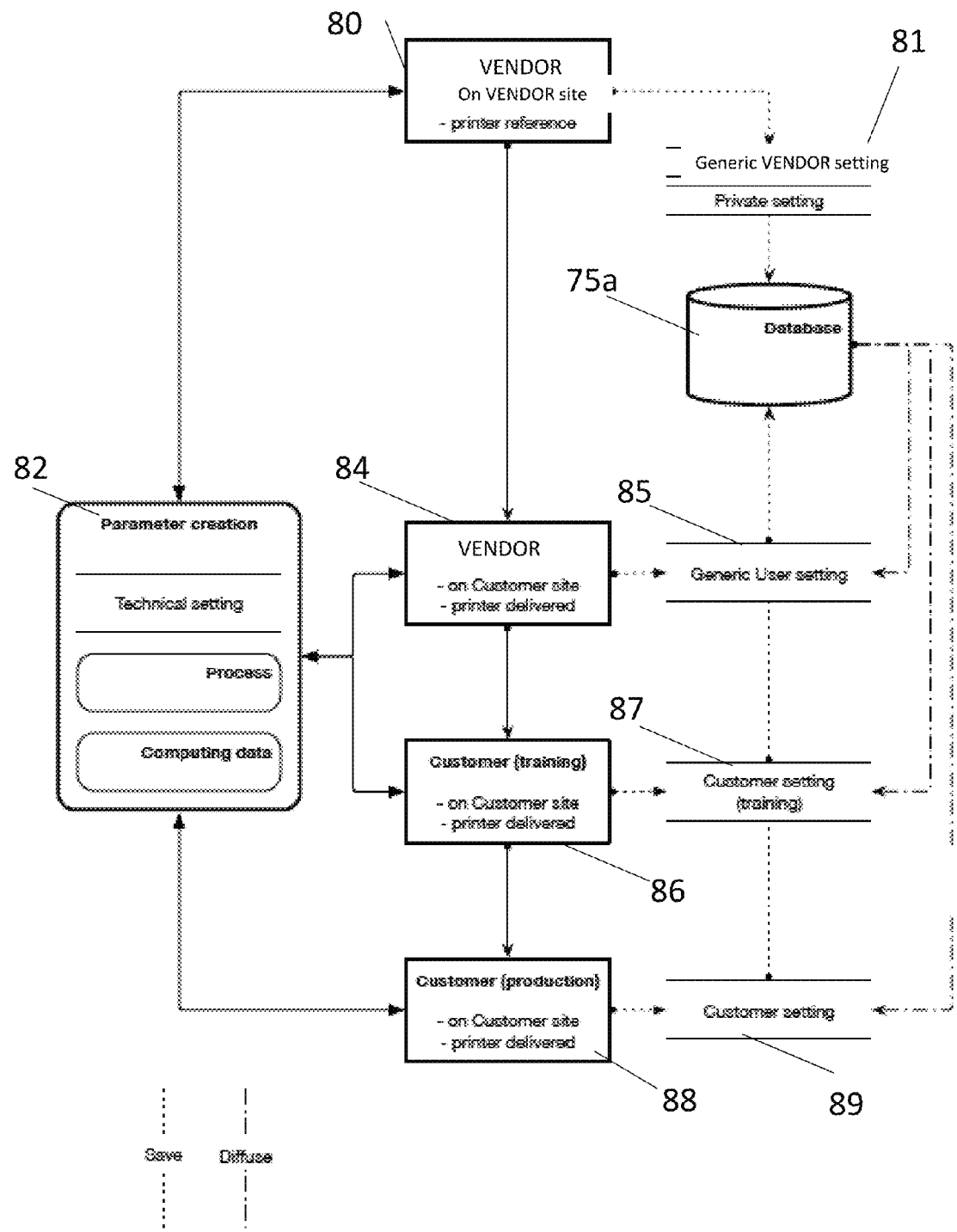
FIG. 8 is a block schematic diagram showing the creating, saving, and diffusion of a model's parameters according to the invention.

FIG. 8 is a block schematic diagram showing the creating, saving, and diffusion of a model's parameters according to the invention. In FIG. 8, a company site 80 provides a printer reference. The company site includes both generic company settings and private settings 81. This information is saved to and retrieved from a database 75*a*

The company site interacts with a parameter creation process 82 that includes technical settings, a process, as described in FIGS. 6 and 7 and computing data.

A printer setting is delivered to a user site 84 with a generic user setting 85, which is retrieved from the database. The user interacts with the parameter creation process, and then enters a training phase.

After user training of the model 86, via interaction with the parameter creation process, a user setting 87 is established and saved to the database.

Thereafter, the user production phase 88 is entered in which the data from the parameter creation process is used to create a final user setting 89, which setting saved to the database.

As can be seen from FIG. 8, a single dotted line indicates those steps in which information is saved to the database and a dashed/dotted line indicates those steps where information is diffused from the database.

Database for Model Parameters Administration

The database is used to store and diffuse user parameters as a backup service, for a matching service to correlate (n) printers together, and for global quality control that provides a quality index and history. In embodiments of the invention, the database stores vendor generic and private parameters, according to predefined setting.

The database also provides major benefits for updating generic and private parameters in accordance with the model's optimization, and provides users with an easy and fast benefit. As well, the database provides smart averaging and tendency estimation for the user's parameters.

Simplified Process for Mixing Model and Real Data

Figure 9:
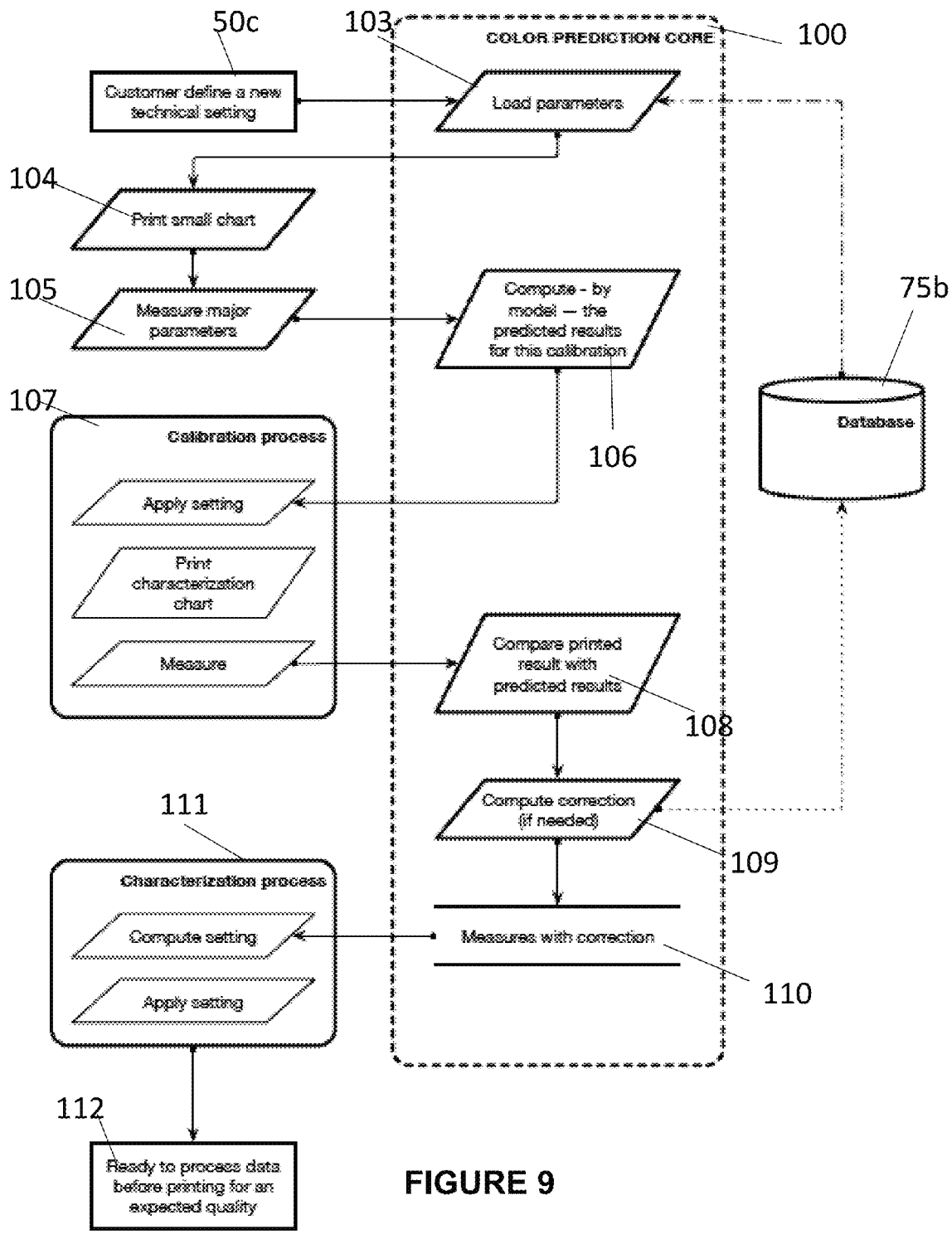
FIG. 9 is a flow diagram showing calibration and characterization by model and the mixing of parameters from a database for custom printing according to the invention.

FIG. 9 is a flow diagram showing calibration and characterization by model and the mixing of parameters from a database for custom printing according to the invention. As shown in FIG. 9, the model parameters are loaded from the database that are chosen as being those parameters that are nearest to the technical settings defined by the user. According to the setting, a chart, e.g. for CMYK, 20 patches, is printed for measurement and comparison with the values loaded from the database. Based on the comparison, the model parameters are adjusted and a complete color prediction is computed, thus providing a virtual measurement of the calibration step. Then, the setting is applied for the characterization phase.

Accordingly, in FIG. 9, a user 50*c* defines a new technical setting. A color prediction core process 100 is invoked in which parameters are loaded (103) from the database 75*b*. The parameters and technical setting information are used to print a chart (104) and the color parameters are measured (105).

As part of the color prediction core process, a model is used to compute predicted results for the calibration (106).

A characterization process 107 is executed, in which the user's technical settings, as processed by the calibration step, are applied and a characterization chart is printed and measured.

As a next step in the color prediction core process, the printed results are compared with the previously measured results (108). If required, a correction is computed (109) and stored in the database. If a correction was required, the print is then measured with the correction applied (109).

The characterization process 111 then proceeds, in which a setting is computed and applied. Thereafter, the system is ready to process data before printing in accordance with the user's expected print qualities (112).

When using the invention it is not necessary to change the current file format for files used in the calibration and characterization phases or the current process for creating such files. In embodiments of the invention, the calibration data format is, for example, 1D LUT (curve), nD LUT (multidimensional curve or device link), and the characterization data format is, for example, an ICC profile.

Simplified Process Using a Sensor on the Printer

For user benefits, embodiments of the invention simplify the whole process by reducing the number of patches to measure; reducing the number of close-loops to that are required, e.g. print, measure, and process data; and reducing the user contribution in the measurement process, by adding sensors on the printer.

For the model, it is necessary to measure physical values which need different device measurement technology.

In embodiments of the invention, spectral reflectance is measured in the visible spectrum, e.g. ≈400 to 700 nm step 10 nm in 45/0° geometry with no filter, with a UV cut filter, and with a polarizing filter.

In embodiments of the invention, spectral transmittance is measured in the visible spectrum, e.g. ≈400 to 700 nm step 10 nm, for a media and ink opacity factor.

In embodiments of the invention, gloss is measured at 60° and/or 45° for a media and ink gloss factor.

In embodiments of the invention, an optional measurement is made of multi-angle reflectance where silver inks are used. See U.S. patent application Ser. No. 13/843,768, filed Mar. 15, 2013; Ser. No. 13/945,771, filed Jul. 18, 2013; and Ser. No. 14/151,703, filed Jan. 9, 2014, each of which application is incorporated herein in its entirety by this reference thereto.

In embodiments of the invention, an optional measurement is made of texture capture by a camera sensor and optical lens when high textured media are used as the print substrate, e.g. canvas, textiles, etc.

Table 2 below provides an example of the number of patches needed as a function of the number of inks used for printing.

TABLE 2

Number of Patches vs. Number of Inks

| Number of inks used | 4 | 5 | 6 | 7 | 8 |
|---|---|---|---|---|---|
| Number of patches needed | 19 | 28 | 39 | 52 | 67 |

Sensor Considerations

Considering that today there is no existing integrated, dedicated device on the market that can make all of the measurements described above, it is necessary, for technical reasons, to consider the use of different devices at the same location for all patches. The measurements described hereinabove could be made manually, but this would require that the measurements be made with devices, where such devices are only required to measure a few patches. This approach could create a risk that the predictions obtained are not accurate, for example because if it is not certain that the measurement device is well positioned relative to the patch. A wrong value or inaccurate value affects the model and the accuracy of the prediction.

However, it is also important to simplify the whole process and reduce processing time to reduce costs and allow more productivity for the printer, i.e. if less time should is spent for calibration and characterization then more time is available for production. If a standalone and expensive measurement device is required, then the benefits of the invention are reduced, even though the embodiments of the invention that require such devices are beneficial.

Considering that the device measurement cost is, to a degree, related to the need to comply with an existing standard, e.g. gloss meter, spectral transmittance, etc., internal model parameters need not follow the constraints posed by such standards because the internal user is the only user of the measurements. In this way, one could develop device measurements with some differences from such standards for cost reduction; for stability and sturdiness in the production environment, e.g. dust, vibration, etc.; for compactness of the measurement head; for a different domain in the acquisition field, e.g. extended or reduced dynamic, etc.; and for use to a protect technology developed with proprietary knowledge.

Thus, in embodiments of the invention the measurement sensor is located at any of different positions on the printer because there are preferably the two main domains of acquisition, i.e. media before printing, e.g. color, opacity, gloss, texture, etc.; and ink printed on the media, e.g. color, opacity, gloss, texture, etc. Information measured by the sensors is required in two different cases, i.e. running an easy calibration and/or characterization process in connection with data on the database, e.g. where the database is found on a cloud server or/and local server; and for quality control at a regular frequency or on a logical case defined by the user in connection with data on the database for comparison and report generation.

Figure 10:
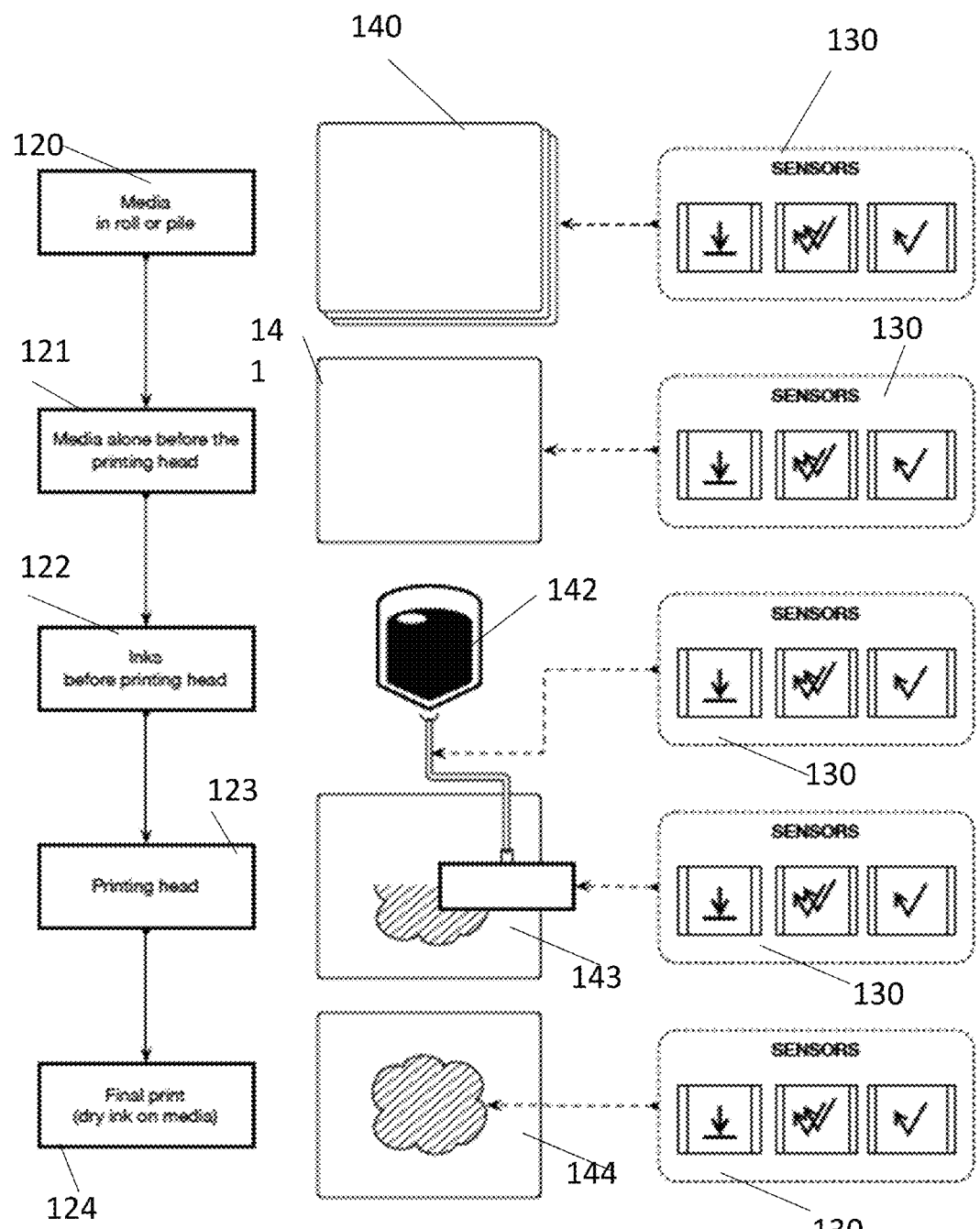
FIG. 10 is a block schematic diagram showing sensor positioning relative to a printing path according to the invention.

FIG. 10 is a block schematic diagram showing sensor positioning relative to a printing path according to the invention. In embodiments of the invention, sensors 130 could be located on or about the printer, for example near the media roll of pile 140 in the printer loading space 120; in the way of media 141 going to printing head 121; on the ink way 122 before printing head 142; on the printing head 123/143 or near the printing head; and after the printing process 124/144, but on the printer, for measuring the final result.

Computer Implementation

Figure 11:
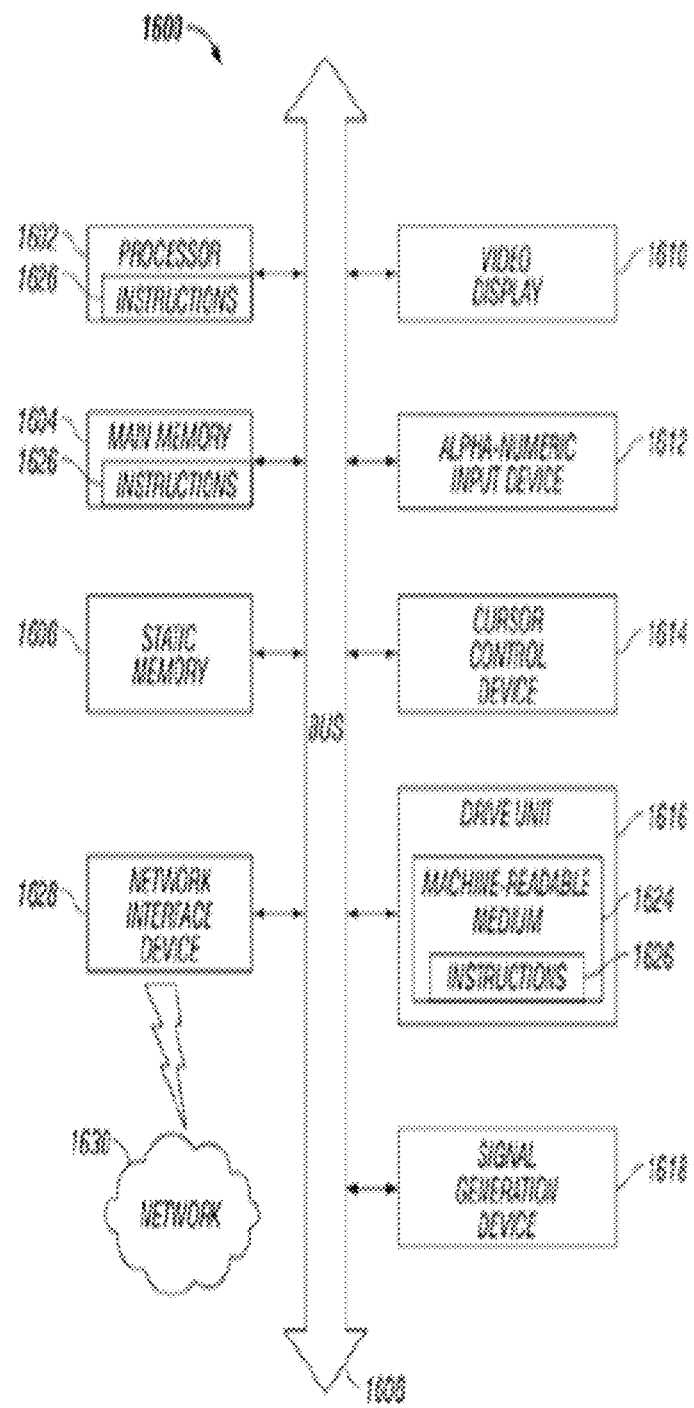
FIG. 11 is a block schematic diagram that depicts a machine in the exemplary form of a computer system within which a set of instructions for causing the machine to perform any of the herein disclosed methodologies may be executed.

FIG. 11 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented color prediction method for color printing, comprising:
    in response to loading media into a printer that does not include a preset for said media and initiation of a calibration sequence, using one or more sensors to measure physical properties of said media;
    based at least upon said measured physical properties, identifying an optimal preset of model parameters in a database;
    loading said optimal preset into said printer as said starting calibration;
    determining a difference from values in said optimal preset loaded into said printer and those of said measured physical properties;
    based upon said determined differences, fine tuning said optimal preset by:
        instructing said printer to print a reference on said media;
        using said one or more sensors to measure said reference printed on said media:
        using said measurements of said reference to fine tune said optimal preset; and
    saving said fine tuned preset as a new media profile.

2. The method of claim 1, further comprising:
    building a model for describing a color fingerprint of a desired setting based on one or more sensor measurements.

3. The method of claim 2, further comprising:
    creating said model parameters;
    loading said parameters from a database to compute a simplified calibration and characterization process; and
    loading said parameters from said database for any of comparison with, and measurement of, image data.

4. A computer implemented color prediction method for color printing, comprising:
- with a processor, in response to loading media into a printer that does not include a preset for said media, initiating a calibration sequence using one or more sensors positioned on said printer to measure physical properties of said media;
- said processor using said sensors for acquiring information regarding said media before ink is printed on said media and after ink is printed on said media;
- said processor, based at least upon said measured physical properties, identifying an optimal preset of model parameters in a database within said printer;
- said processor loading said optimal preset into said printer as a starting calibration;
- said processor determining a difference from values in said optimal preset loaded into said printer and those of said measured physical properties;
- said processor instructing said printer to print a reference on said media;
- said processor using said one or more sensors to measure said reference printed on said media;
- said processor using said measurements of said reference to fine tune said optimal preset; and
- said processor saving said fine tuned preset as a new media profile in said database for said media.

* * * * *